US005253406A

United States Patent [19]

Shere et al.

[11] Patent Number: 5,253,406

[45] Date of Patent: Oct. 19, 1993

[54] BRAKE CLIP TOOL

[75] Inventors: Marty R. Shere, Omaha, Nebr.; Eugene R. Ross, Omaha; Randall J. Ploeger, Clarinda, both of Iowa

[73] Assignee: Lisle Corporation, Clarinda, Iowa

[21] Appl. No.: 977,566

[22] Filed: Nov. 17, 1992

[51] Int. Cl.[5] .......... B23P 19/06

[52] U.S. Cl. .......... 29/240; 29/293.56; 29/270; 29/278

[58] Field of Search .......... 29/270, 243.56, 278, 29/280, 282, 283, 240, 233; 140/149, 123, 106; 81/451, 461

[56] References Cited

U.S. PATENT DOCUMENTS

| | | | |
|---|---|---|---|
| 1,918,944 | 7/1933 | Wells et al. | 81/451 |
| 3,211,189 | 10/1965 | Wheeler | 140/123 |
| 3,633,640 | 1/1972 | Moore | 81/451 |
| 4,736,657 | 4/1988 | Hicks | 81/461 |
| 5,068,954 | 12/1991 | Houska | 29/240 |

OTHER PUBLICATIONS

Part No. 3351, in K-D Tools catalog.

Part No. 298, in K-D Tools catalog.

*Primary Examiner*—Robert C. Watson

*Attorney, Agent, or Firm*—Allegretti & Witcoff, Ltd.

[57] ABSTRACT

An improved brake clip tool includes a handle with a shaft projecting therefrom and a slot at the end of the shaft for cooperation with the head of a clip retaining pin. A rotatable collar or tip is provided at the end of the shaft for engaging the spring clip of the brake shoe assembly so that the retaining pin can be rotated relative thereto.

3 Claims, 3 Drawing Sheets

FIG. 1
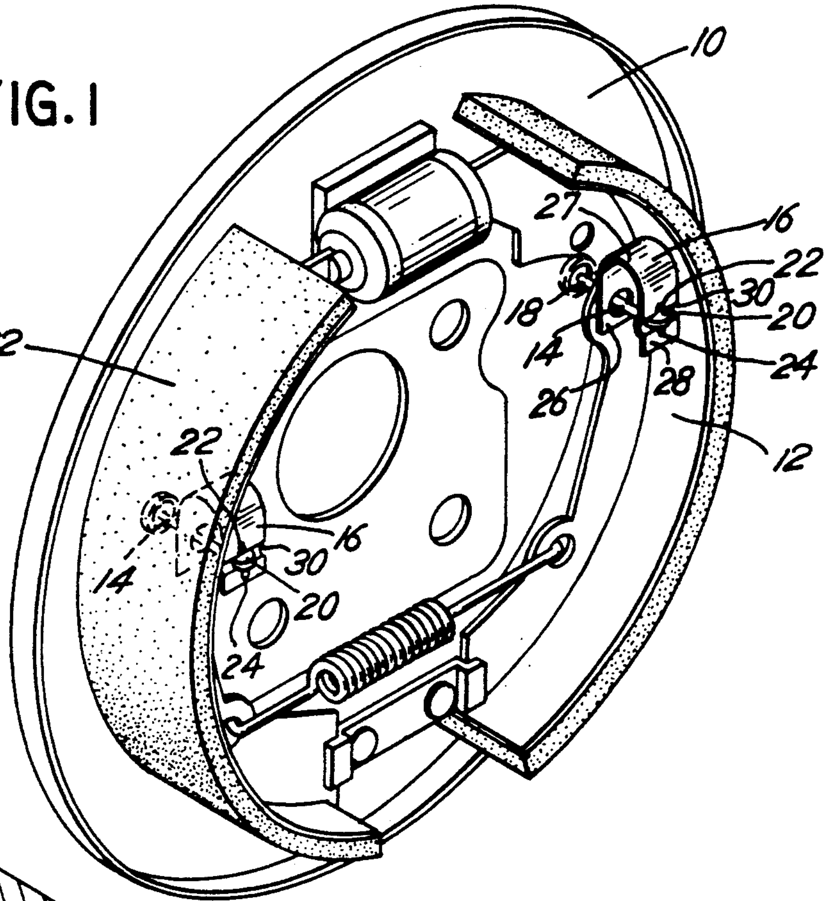
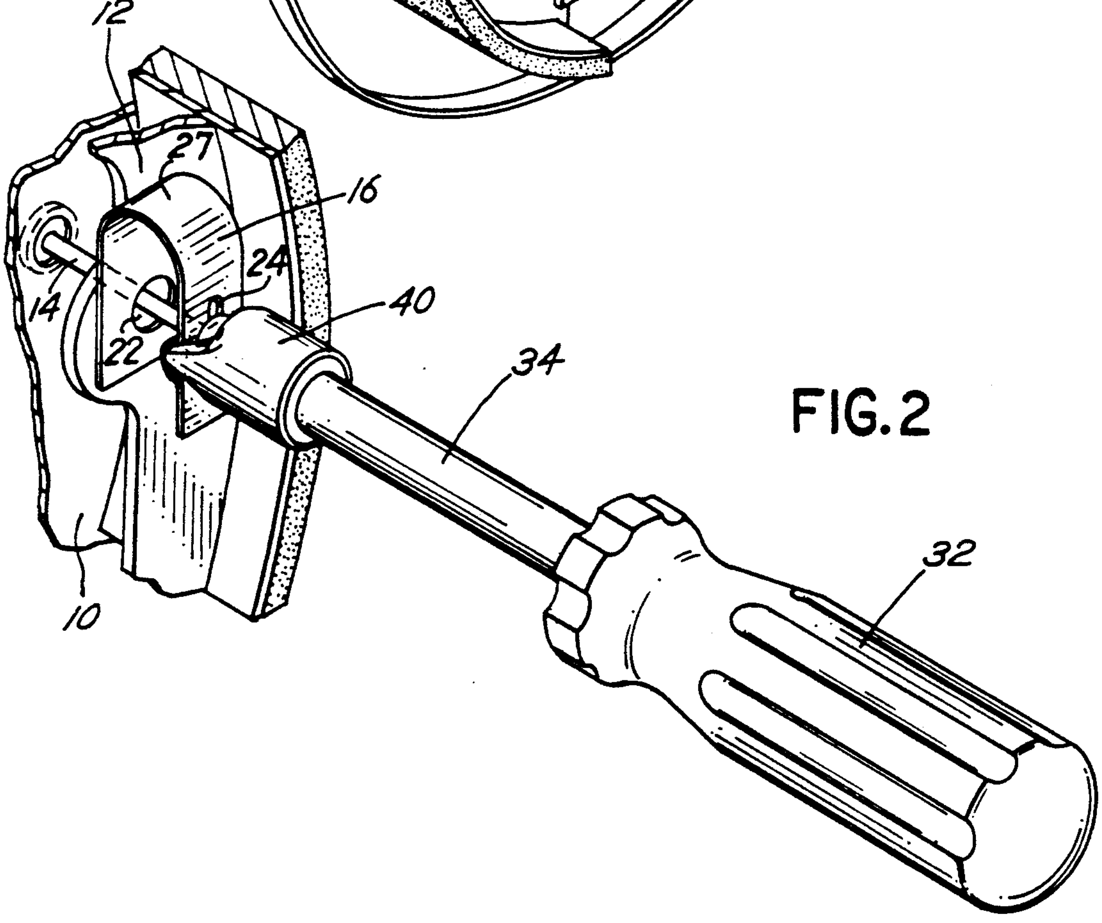
FIG. 2

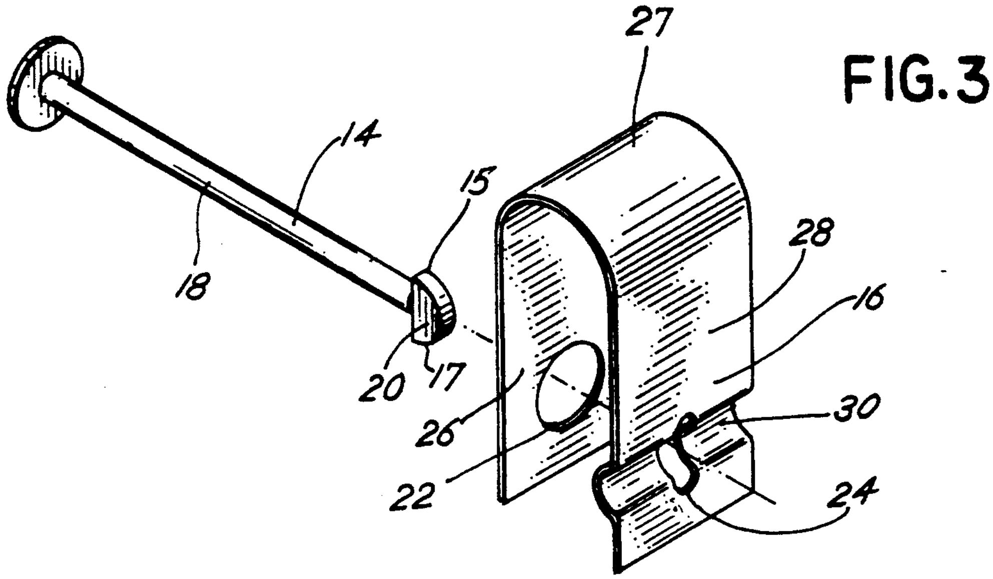
FIG.3
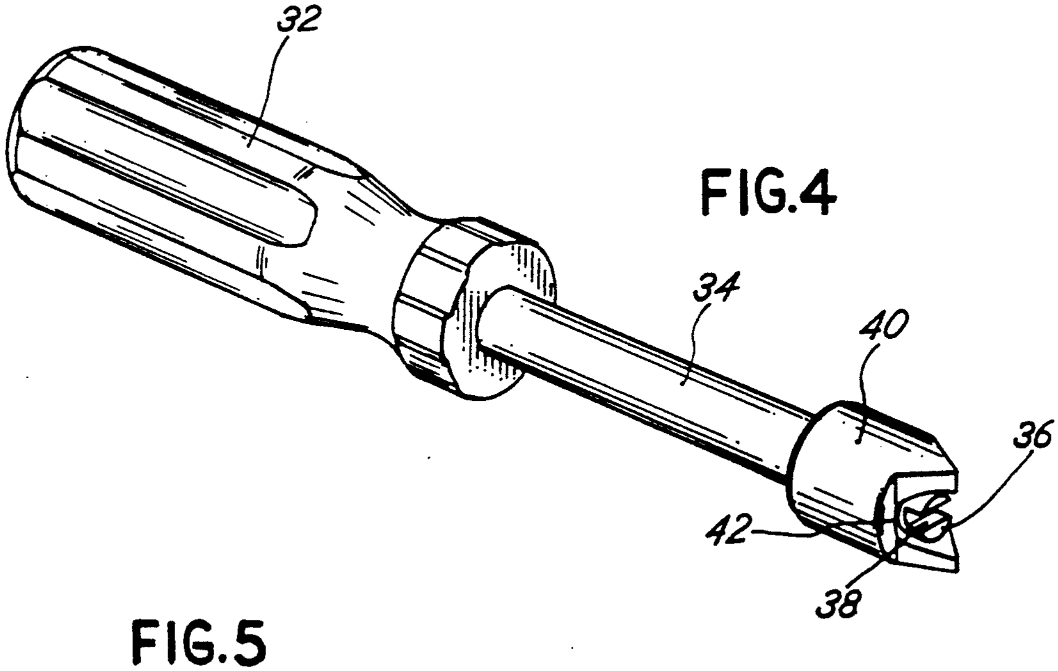
FIG.4
FIG.5
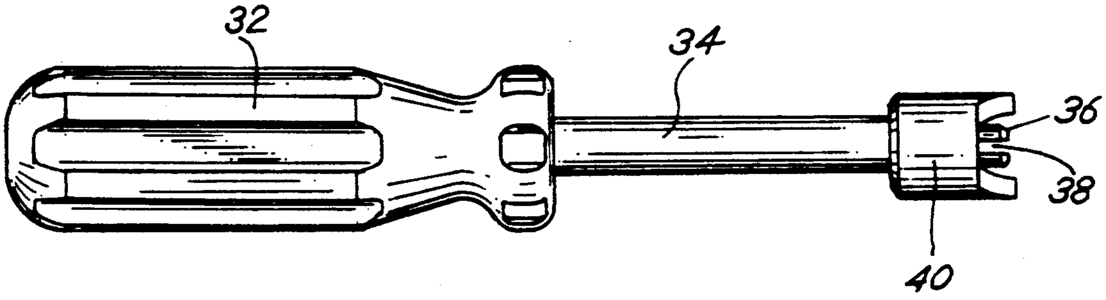

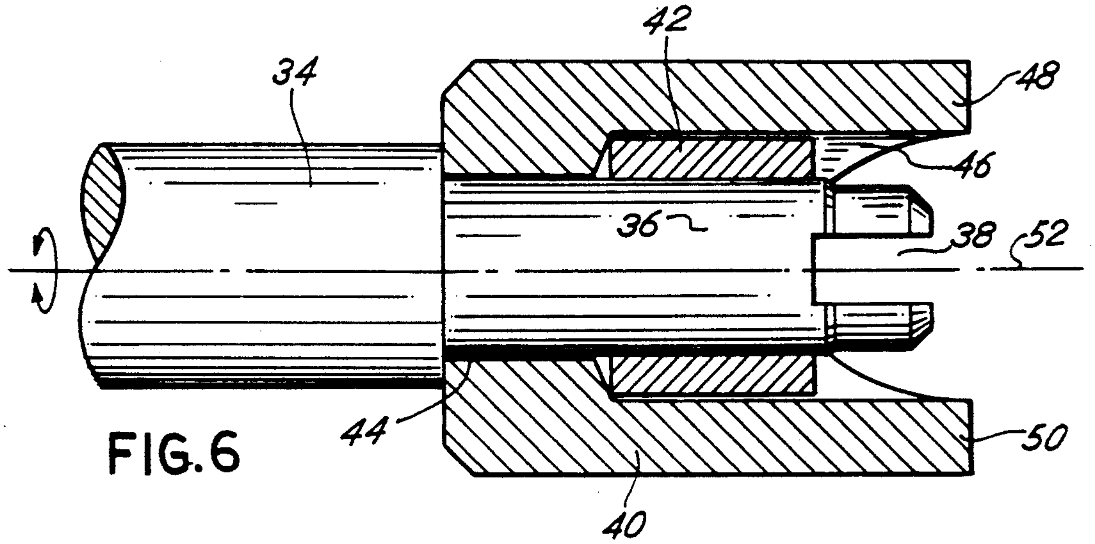
FIG.6
FIG.7
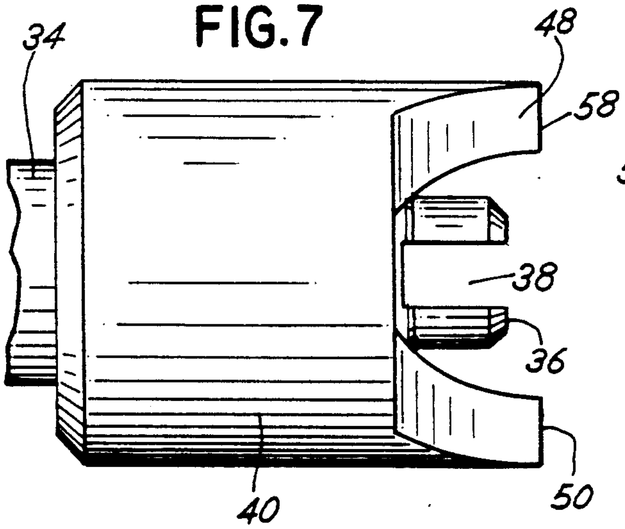
FIG.8
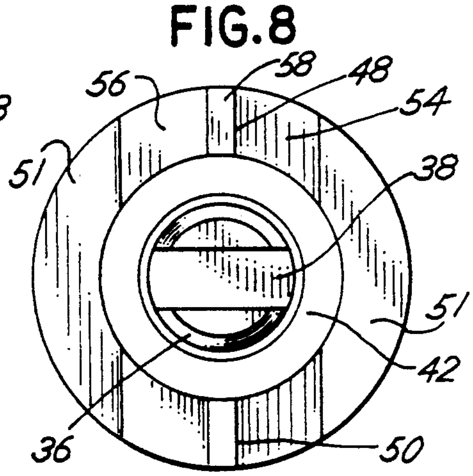
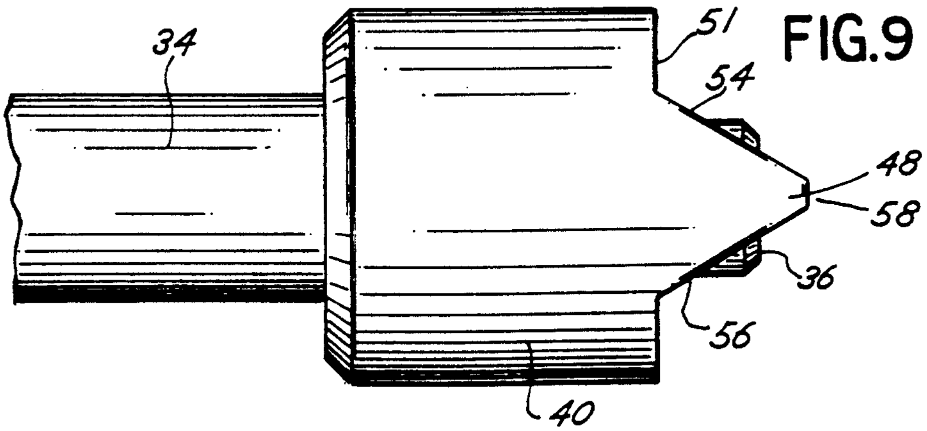
FIG.9

BRAKE CLIP TOOL

BACKGROUND OF THE INVENTION

This invention relates to a tool useful for the repair of brakes on automobiles, and, more particularly, to a tool which is useful for coupling or decoupling a retaining pin from a spring type retaining clip that fastens a brake shoe onto a brake backing plate associated with a vehicle.

Many non-U.S. manufactured automobiles and some U.S. manufactured automobiles utilize a brake construction for a drum type brake wherein the brake shoe assembly for drum type brakes is supported on a backing plate by a retaining pin which cooperates with a spring type retaining clip. The retaining clip is a typically u-shaped having spaced, parallel legs attached by a crown with a slot in each leg to receive the retaining pin. The retaining pin has a T-shaped head which is configured to fit through the slots when appropriately oriented with respect to the slots. After insertion through the slots, the retaining pin is rotated 90° to engage a groove in a leg of the clip and thus hold the retaining clip in place against the brake shoe assembly. The brake shoe assembly is thereby retained on its backing plate.

Often when work is being done on such a brake system, it is necessary to remove the brake shoe assembly and thus decouple the retaining pin from the retaining clip in order to release the shoe assembly from its backing plate. Heretofore, in order to decouple the retaining pin from the clip, a pliers could possibly be used. Alternatively, mechanics would try to decouple the pin from the clip manually or with some other standard tool. These approaches, though ultimately effective, were not considered satisfactory. As a result, there has developed a need for an improved tool to decouple and recouple a retaining pin from a retaining clip in a brake shoe assembly. The present invention constitutes such an apparatus or tool.

SUMMARY OF THE INVENTION

Briefly, the present invention comprises a tool for decoupling a retaining pin from a brake spring clip of the type which is a generally u-shaped spring member having opposed, parallel spring legs with generally aligned slots therethrough to receive the pin and with a groove in one of the legs to engage the head of such a pin. The tool has a screw driver type handle. A shaft projects from the handle and terminates with a transverse slot for engaging and axially twisting the head of the retaining pin. A tubular collar is rotatably mounted on the end of the shaft and fits over the tip or end of the shaft. The collar includes first and second axially projecting prongs which are configured to cooperatively engage with the groove of the spring member. The prongs may thus be inserted into the groove of the spring member while the slot at the end of the shaft simultaneously engages with the head of the retaining pin. The head of the pin may then be rotated relative to the collar and spring to thereby align the head with the slots in the legs of the spring member. The head is shaped to be congruent with the shape of the slots so that when the head is aligned properly with the slots, it may pass therethrough. However, when rotated out of congruent alignment with the slots, the head may not pass therethrough. Thus when the pin is properly aligned with respect to the slots by appropriate rotation about the axis of the pin, the spring may be decoupled from the retaining pin. The reverse operation may be effected to recouple the pin to the retaining clip or spring.

Thus, it is an object of the invention to provide an improved tool which is useful for decoupling the retaining pin of a brake shoe assembly from a retaining spring or clip associated with that brake shoe assembly.

It is further object of the present invention to provide an improved tool wherein the tool has a form or configuration which is easily manipulated manually in order to effect removal of a brake shoe assembly from a backing plate wherein that brake shoe assembly is held by the combination of a retaining pin and retaining clip that are cooperatively engaged with one another.

It is further object of the present invention to provide an improved brake clip or spring removal tool which is easy to use and manipulate, inexpensive, rugged and which can be efficiently and effectively utilized.

These and other objects, advantages and features of the invention will be set forth in detail in the following description.

BRIEF DESCRIPTION OF THE DRAWING

In the detailed description which follows reference will be made to the drawing comprised of the following figures:

FIG. 1 is an enlarged perspective view of a typical drum brake shoe assembly construction which is retained on its associated backing plate by means of a u-shaped, hold down clip or spring and a cooperative retaining pin;

FIG. 2 is an enlarged perspective view of the improved tool of the present invention as it is utilized in cooperation with a retaining pin and retaining clip of the type utilized on brake shoe assembly shown in FIG. 1;

FIG. 3 is an further perspective view of a typical retaining pin and hold down clip as utilized in the brake shoe assembly of FIG. 1;

FIG. 4 is a perspective view of the improved tool of the invention;

FIG. 5 is a side elevation of the tool of FIG. 4;

FIG. 6 is an enlarged cross-sectional view of the tip or end of the shaft of the tool depicted in FIG. 5;

FIG. 7 is an enlarged side elevation of the tip of the tool of FIG. 4;

FIG. 8 is an enlarged end elevation of the tip of FIG. 7; and

FIG. 9 is an top view of the tip shown in FIG. 7.

DESCRIPTION OF THE PREFERRED EMBODIMENT

Referring first to FIG. 1, there is illustrated a typical brake shoe and backing plate assembly or construction which utilizes a clip or spring and cooperative retaining pin. Thus, the backing plate 10 has a brake shoe assembly 12 held thereon by means of retaining pin 14 which engages with clips 16 to hold the brake shoe assembly 12 on the plate 10. Typically, the plate 10 includes at least two pins 14 projecting therefrom. Each pin 14 is configured to include a generally cylindrical, rod shaped section 18 and a shaped head 20. The head 20 is T-shaped and includes prongs 15, 17 which extend laterally from the center rod section in opposite directions. The retaining pin 14 is generally referred to by mechanics as a "nail". The pin 14 is rotatable or pivotal about its axis, though it is attached to plate 10. Pin 14 and more particularly prongs 15, 17 fit through a first passage 22 and a second elongated slot 24 in spaced, parallel legs 26, 28 respectively of u-shaped spring clip 16. The openings 22 and slot 24 are aligned with each other. Opening 22 is configured so as to receive head 20, and generally elongated slot 24 is congruent with the shaped head 20 of the pin 14 when properly aligned.

The clip 16 thus has two legs 26 and 28 which are connected together by a crown 27 to define a u-shaped spring clip 16. A transverse groove 30 is defined in the outer leg 28 for cooperation with the head 20 of the pin 14 when the pin 14 is rotated so as to align the wide dimension, i.e. prongs 15, 17, of the head 20 with the groove 30. Thus, the head 20 is fitted into the groove 30 when the pin 14 is locked into engagement with the clip 16. The clip 16, and more particularly the legs 26, 28, are biased away from each other by crown 27. When the pin 14 is engaged in groove 30, the legs 26, 28 are slightly compressed together to thereby effect retention of the pin 14 by the clip 16 and also to hold the brake assembly 12 onto the backing plate 10 since pin 14 is first fitted through openings in assembly 12.

The spring or clip 16 is thus fitted over the pin 14 and the pin 14 is rotated to lock the pin 14 to the clip 16 and thereby hold the brake assembly 12 on plate 10. Also, the pin 14 may be rotated to cause the head 20 to be aligned with the slot 24 so that the clip 16 may be removed from the pin 14, and thus the entire brake shoe assembly 12 may be released from the backing plate 10. Heretofore, the rotation of the pin 14 was effected by a pliers or manually. This operation to decouple or couple the pin 14 to the clip 16 was difficult and cumbersome at best.

With the tool of the invention, depicted in FIGS. 4 through 9, the pin 14 may be engaged and twisted to couple or decouple from the clip 16 in a quick easy and simple operation. Thus, referring to the remaining FIGS. 4 through 9, the tool of the invention is comprised of a handle 32 from which a shaft 34 projects axially. Handle 32 is a handle of the type which is typically utilized for a screwdriver. Thus handle 32 may be molded from cellulose acetate, for example. The shaft 34 is a cylindrical member, typically a steel rod. The distal or free end of the shaft 34 has a highly specialized construction. That is, the free end of the shaft 34 includes a reduced diameter end section 36 with a transverse slot 38 therethrough. A special collar 40 is rotatably mounted on the section 36. The collar 40 is retained by a bushing or spacer 42 which is an annular washer that is friction fitted on the end section 36. The construction of the collar 40 is depicted in greater detail in FIGS. 6,7,8 and 9.

The collar 40 includes a cylindrical throughbore 44 having a first, reduced diameter which rotatably cooperates with the cylindrical end section 36. A greater diameter counterbore 46 extends the remaining distance through the collar 40. The spacer 42 frictionally fits on the end section 31 and rotatably within the counterbore 46 to retain the collar 40 on the end 36. The collar 40 thus may rotate relative to the shaft 34.

The collar 40 further includes first and second axially projecting, end prongs 48 and 50 which are spaced 180° from each other about an axis 52 associated with the shaft 34. The prongs 48, 50 each extend axially slightly beyond the end of the shaft 34 and the slot 38.

In operation, the slot 38 is fitted over the head 20 of the retaining pin 14. The prongs 48, 50 are simultaneously fitted within the groove 30 of the clip 16 on each side of the head 20 of the pin 14. The shaft 34 is then manually rotated to thereby rotate the pin 14 relative to the clip 16. As shaft 34 rotates, collar 40 remains effectively locked to the clip 16, and clip 16 is held manually or otherwise is made non-rotatable. In this manner the pin 14 may be twisted to align prongs 15, 17 with slot 24 so that the clip 16 can be coupled or decoupled. The tool of the invention may thus be used for both attaching or detaching the brake shoe assembly 12 from its associated backing plate 10.

It is to be noted that the prongs 48, 50 of collar 40 are spaced from one another a distance which is greater than the maximum diameter of head 20. Further, prongs 48, 50 in the preferred embodiment are spaced an equal radial distance from axis 52 and each prong 48, 50 has an identical wedge shape. In the preferred embodiment, the wedge shape is defined by first and second planar inclined surfaces 54, 56 which defined or subtend an angle of about 60° and are joined by a planar, end surface 58 transverse to axis 52. Prongs 48, 50 project axially from surface 51.

Various modifications may be incorporated in the tool. For example, the use of two prongs may not necessarily be required. Further, the configuration of the slot 38 may be altered. Thus while there has been set forth a preferred embodiment of the invention, it is to be understood that the invention is to be limited only by the following claims and their equivalents.

What is claimed is:

1. A tool for attachment and removal of a brake spring clip of the type having a U-shaped spring member with legs having generally aligned slots and a groove in one of the legs, said groove unaligned with the slots, said slots adapted to receive a headed pin, said pin rotatable in the groove to permit locking engagement of the head of the pin, and the clip, said tool comprising, in combination:

a screw driver handle defining an axis;

a shaft projecting along the axis from the handle, said shaft terminating with a slot for engaging and axially twisting the head of the pin;

a tubular collar rotatably mounted on the end of the shaft, said collar including first and second axially projecting prongs for cooperatively engaging the groove in the spring leg, whereby the prongs may be inserted into the groove simultaneously with engagement of the slot with the head of the pin, and the head may be rotated by rotation of the shaft relative to the clip to release the head through the slot and thus release the spring clip and a brake shoe held thereby.

2. The tool of claim 1 wherein the prongs comprise generally pointed, wedge shaped prongs which fit compatibly into the groove of a spring.

3. The tool of claim 1 wherein the collar is mounted on an annular spacer compression fitted over the shaft and positioned in a counter bore in the collar with a radially inward extending flange projecting from the collar and retained intermediate a land on the shaft and the spacer to thereby prevent removal of the collar from the shaft.

* * * * *